United States Patent [19]
Luftig et al.

[11] Patent Number: 5,518,403
[45] Date of Patent: May 21, 1996

[54] ROLLOVER FIRE FIGHTING TRAINER

[75] Inventors: Steven Luftig, Oakland; James Ernst, Livingston; Patrick Connelly, Edison; Steven Williamson, Haledon, all of N.J.

[73] Assignee: Symtron Systems, Inc., Fair Lawn, N.J.

[21] Appl. No.: 217,987

[22] Filed: Mar. 25, 1994

[51] Int. Cl.⁶ .................................................. G09B 19/00
[52] U.S. Cl. ........................................................ 434/226
[58] Field of Search ...................................... 434/226, 219

[56] References Cited

U.S. PATENT DOCUMENTS 5,181,851  1/1993  Layton et al. ........................ 434/226
5,226,818  7/1993  Feiock et al. ........................ 434/226
5,233,869  8/1993  Rogers et al. ..................... 434/226 X

*Primary Examiner*—Paul J. Hirsch
*Assistant Examiner*—Jeffrey A. Smith
*Attorney, Agent, or Firm*—Richard T. Laughlin; Ribis, Graham & Curtin

[57] ABSTRACT

A fire fighting trainer for use in training fire fighters about a ceiling rollover fire. This trainer includes a chamber with a ceiling and includes a burner head subassembly and includes a burner control subassembly. The burner head subassembly has a fuel gas inlet pipe and an adjacent combustion air inlet pipe to produce an air/gas mixture which creates a flame at the ceiling. The burner control subassembly selectively increases the fuel gas flow to make the produced flame have a ceiling rollover effect.

7 Claims, 3 Drawing Sheets

ROLLOVER FIRE FIGHTING TRAINER

FIELD OF THE INVENTION

The invention relates to a trainer for teaching fire fighting and, in particular, the invention relates to such a fire fighting trainer having a ceiling rollover flame.

BACKGROUND OF THE INVENTION

The prior art fire fighting trainer having a burner is described in U.S. Pat. No. 4,861,270, issued Aug. 29, 1989. The prior art fire fighting trainer includes at least one chamber, and includes a burner assembly disposed in the chamber, said burner assembly having a burner head subassembly and a burner control subassembly connected to the burner head subassembly, said burner head subassembly having a burner head perforated pipe with a fuel gas supply line from the burner control subassembly, said burner head subassembly having a pilot gas supply line from the burner control subassembly.

SUMMARY OF THE INVENTION

According to the present invention, a trainer for teaching and practicing fire fighting is provided which has a simulated ceiling rollover flame. One of the many dangers in fighting fires is that a rollover flame can quickly develop across the ceiling and result in a flashover condition which can seriously endanger firefighter safety. In an actual fire scenario, a rollover condition occurs when unburned gases, released during the early stages of a fire, accumulate at the ceiling level in a chamber and are ignited by the primary flame source. A flashover condition occurs after a rollover when the involved space becomes super-heated and the combustible contents of the chamber spontaneously ignite. The suddenness of a rollover condition and the fact that it frequently signals imminent flashover underscores the critical need for firefighters to practice in recognizing the condition and reacting promptly to invoke appropriate safety measures. This invention is directed to an apparatus and method for creating a trainer which simulates this ceiling rollover flame.

The fire fighting trainer comprises at least one chamber, configured as described in U.S. Pat. No. 4,861,270, in addition to a burner assembly having a burner head subassembly partly disposed in the chamber near the ceiling level and a burner control subassembly disposed outside the chamber, said burner head subassembly having a burner head perforated pipe with a fuel gas inlet line from the control subassembly and having gas outlet openings. The burner head subassembly has a pilot nozzle which mixes combustion air supplied from the burner control subassembly with fuel gas supplied from the burner control subassembly, whereby an outlet flame is produced by introducing fuel gas into the pilot nozzle flame at the ceiling creating a flame rollover effect. Flame appearance can be varied by adjusting pressure and flow of fuel gas in the inlet lines according to a computer program and the burner control subassembly.

The use of the burner assembly with a fuel gas outlet opening at the ceiling and by using the computer-controlled burner control subassembly, the ceiling rollover flame effect can be provided.

The burner control assembly provides pilot gas, pilot combustion air and main fuel gas to the burner head. Pilot gas and pilot combustion air are mixed within the burner head to provide pilot flame. The spark igniter ignites the pilot mixture in the burner head. The main fuel gas, which is the source for the ceiling rollover flame, is prohibited from being discharged until the pilot flame is verified by the flame safeguard unit. The flame rod, located in the burner head, works in conjunction with the flame safeguard unit to confirm the presence of a pilot flame.

The thermocouple located below the burner head also detects the presence of a pilot flame (backup confirmation) and provides input to a temperature control unit located in the burner control subassembly.

One of the objects of the invention is to provide a trainer burner assembly which furnishes a flame with a ceiling rollover effect. Other objects, features and the advantages of the invention will be apparent from the following detailed description of the preferred embodiment of the invention as illustrated in the accompanying drawings.

DESCRIPTION OF THE PREFERRED EMBODIMENT

Figure 1:
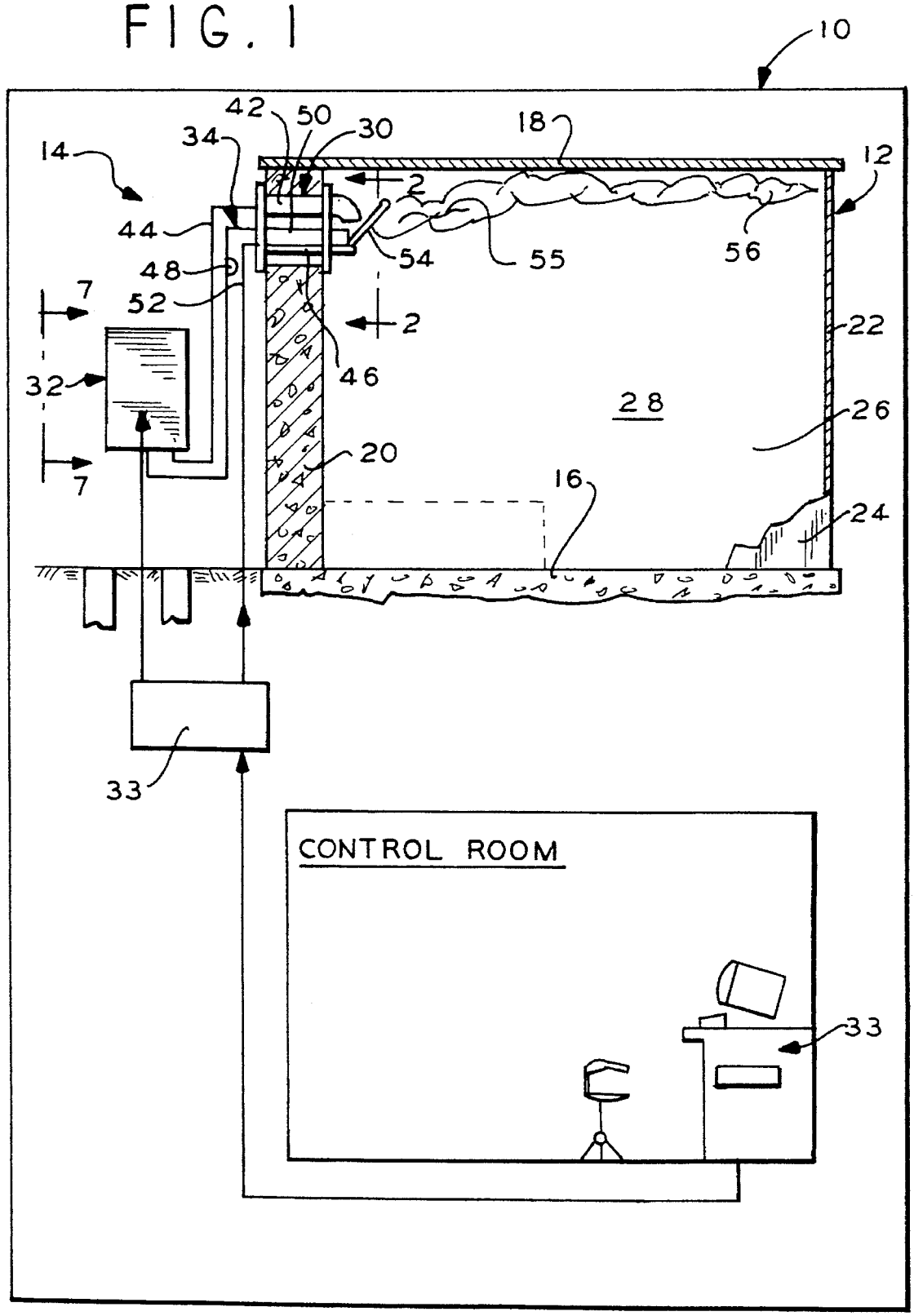
FIG. 1 is a section view of a fire fighting training compartment according to the present invention.
Figure 2:
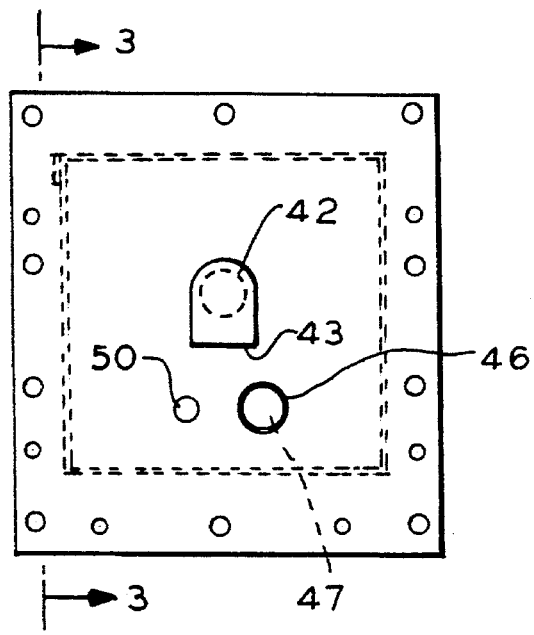
FIG. 2 is a section view as taken along the line 2—2 of FIG. 1.

As shown in FIG. 1, a fire fighting trainer generally indicated at 10 is provided. The trainer 10 has a chamber 12, already equipped with a floor-level fire fighting trainer as identified in U.S. Pat. No. 4,861,270 and a rollover burner system or module or assembly 14. The burner assembly 14 simulates an actual rollover fire condition within chamber 12 during operation of the apparatus.

As shown in FIG. 1, chamber 12 has a floor surface or slab 16, a top wall or ceiling surface 18, a front wall or masonry wall 20, a rear wall or surface 22, a near or right side wall 24, and a far or left side wall 26. Walls 16, 18, 20, 22, 24 and 26 enclose a compartment or chamber 28 wherein fire fighting training is carried out.

As also shown in FIG. 1, burner assembly generally indicated at 14 includes a burner head subassembly 30, and a burner control subassembly 32, which is controlled by a computer unit (or units) 33 that has a software program (not shown). The burner assembly 14 also includes a thermocouple assembly 50.

As show in FIGS. 2, 3, 4 and 5, the burner head subassembly 30 includes a four-sided support frame 36 which fits into a wall opening 38 of front wall 20, adjacent to the top wall 18. Frame 36 has a plate 40 which is anchored or bolted to front wall 20. The burner head subassembly 30 has an electrically ignited burner head 42 with outlet 43 and has a burner head pilot gas line 44, which connects to burner control subassembly 32. The burner head subassembly 30 also has a fuel gas feed pipe 46 with outlet 47 and has a air feed line 48 which connects to burner control subassembly 32.

Figure 3:
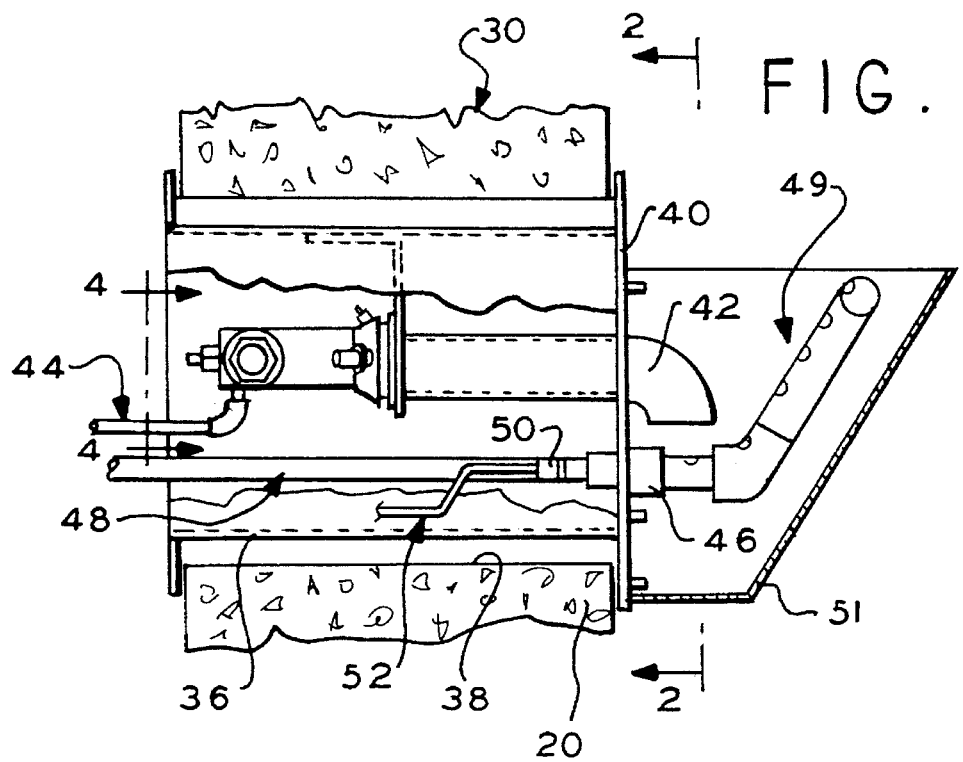
FIG. 3 is a section view as taken along the line 3—3 of FIG. 2.
Figure 4:
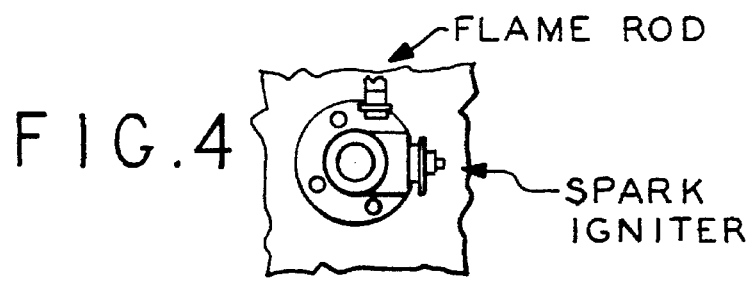
FIG. 4 is a section view as taken along the line 4—4 of FIG. 3.

Thermocouple assembly 50 can be seen by reference to FIG. 3, which is partly disposed in chamber 28. Thermocouple assembly 50 has a thermocouple cable 52, which connects to computer 33 as shown in FIG. 1. The burner element 49 provides a rollover flame 54, which provides a rollover fire effect 56. Shield 51 hides the pilot flame 54 from the trainee's view and protects the burner element 49 from direct agent impingement.

Figure 5:
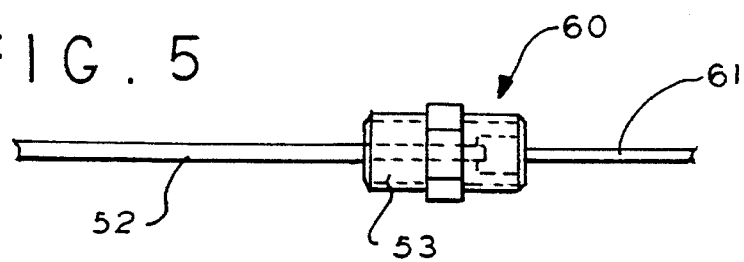
FIG. 5 is a detail view of a portion of FIG. 1.

As shown in FIG. 5, thermocouple assembly 60 is an inseparable assembly consisting of a flame-resistant probe or sheath 61 that is welded to an exteriorly-threaded flame-resistant plug 53. Plug 53 has a dual-wire insulated cable 52.

Figure 6:
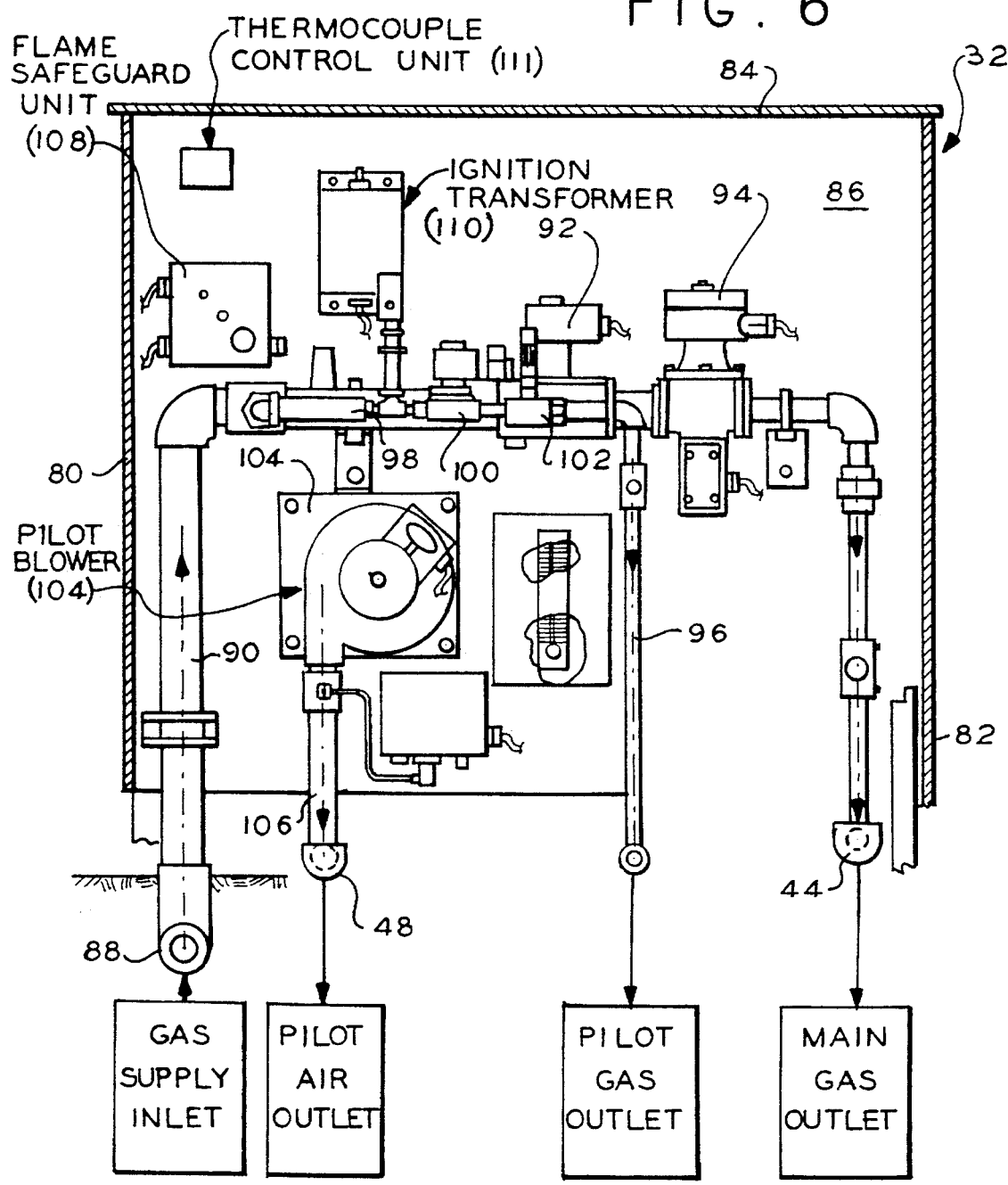
—FIG. 6 is a section view as taken along the line 7—7 of FIG. 1.

As shown in FIG. 6, burner control subassembly 32 includes left and right end cover plates 80 and 82, a top plate 84 and a rear pipe-support plate 86, and a fuel gas supply line 88 with two main gas control components 92 and 94. Control subassembly 32 also includes a pilot fuel gas feed line 96 with three pilot gas feed line control components 98, 100 and 102, and includes a pilot combustion air blower 104 with a pilot combustion air blower outlet pipe 106. Burner control subassembly 32 also has a flame safeguard unit 108, an ignition transformer unit 110 and a temperature control unit 111.

Computer unit 33 has a software program (not shown) which adjusts the pressure, velocity and flow of fuels in line 44 and air in line 48, so that flame 55 can move across the ceiling surface 18 to provide a fire rollover effect 56.

In operation, assembly 14 will generate a computer-controlled gas-fueled rollover fire effect that will meet the training requirements of fire fighting training facilities.

Assembly 14 contains the hardware to generate an instantaneous fire along the ceiling of a fire fighting training compartment to simulate an actual rollover fire condition. In addition to generating the ceiling fire, this module provides flame-sensing equipment and fail-safe valving to ensure safe operation. Assembly 14 has three (3) subsystems:

1. Burner head subassembly 30 has hardware that mixes fuel gas and air to produce an inextinguishable pilot flame 54.
2. Burner control subassembly 32 has hardware and software that controls fuel gas flow, including fail-safe valving and pressure regulation.
3. Flame verification unit 34 has hardware that confirms the presence of the pilot flame 54 at the point of flame ignition.

Assembly 14 yields a realistic visual fire effect 56 without compromising safety. The rollover hardware provides elements 30, 32 required to support combustion (heat source, oxygen and fuel) while the system sensors and software provide constant monitoring of all local environmental conditions to provide a safe, reliable effect upon command at the most realistic time during the training scenario.

The advantages of trainer 10 are indicated hereafter.

A) Trainer burner assembly 14 provides a flame 55 which has a ceiling rollover effect 56.

B) Trainer burner assembly 14 uses a computer program to accurately control a flame 55 which rapidly creeps across the ceiling surface 18 by adjusting fuel gas and air flow in the feed lines 44 and 48.

C) Trainer burner assembly 14 verifies the presence of the pilot flame 54, and when the pilot flame 54 is not present, it safeguards the trainer 10 by shutting down fuel flow in feed lines 44 and 96.

While the invention has been described in its preferred embodiment, it is to be understood that the words which have been used are words of description rather than limitation and that changes may be made within the purview of the appended claims without departing from the true scope and spirit of the invention in its broader aspects.

For example, trainer 10 can have multiple chambers in place of a single chamber 28, and each chamber can have its respective burner control subassembly and fault verification subassembly, and the trainer 10 can have a common computer control subassembly with separate gas and air lines to each chamber from the respective burner control subassemblies.

What is claimed is:

1. A fire fighting trainer comprising:
   at least one training chamber having a plurality of walls and a ceiling;
   a burner assembly having a burner head subassembly partly disposed inside the chamber at the ceiling and a burner control subassembly disposed outside the chamber;
   said burner head subassembly having a burner head pipe with a fuel gas inlet line from the burner control subassembly and with a fuel gas outlet opening;
   said burner head subassembly having a pilot nozzle pipe and fuel gas inlet line from the control subassembly and with an outlet opening disposed adjacent to the fuel gas outlet opening and adjacent to a selective wall and directed nearly parallel to the selective upper wall or ceiling;
   a combustion air blower; and
   a combustion air blower line having an inlet end portion connection to the combustion air blower and having an outlet end portion connected to the burner fuel gas inlet line;
   whereby an outlet flame with a flame crossover effect can be provided by adjusting fluid flow and pressure and velocity in the inlet lines.

2. The trainer of claim 1, wherein the burner control subassembly is controlled by a computer with a program which controls the fuel flow, pressure and velocity in the inlet lines.

3. The trainer of claim 1, including a flame confirmation thermocouple probe disposed inside the burner head subassembly adjacent to the fuel gas outlet opening and the pilot flame nozzle outlet opening.

4. The trainer of claim 3, wherein fuel gas in the gas inlet line is a combustible hydrocarbon fuel gas.

5. The trainer of claim 4, wherein the burner control subassembly comprises:
   a main gas line having an inlet end portion connected to a fuel gas supply pipe and having an outlet end portion connection to the burner head gas inlet line and having an intermediate portion with a plurality of fuel gas line components; and
   a combustion air blower line having an inlet end portion connection to the combustion air blower portion and having an outlet end portion connected to the burner head air inlet and having an intermediate portion with a plurality of combustion air blower line components.

6. The trainer of claim 5, wherein the main gas line components include an electrically-operated fuel shutdown valve and the combustion air blower line components, said components being actuated by electrical signals controlled by the computer unit.

7. A fire fighting trainer comprising:

at least one training chamber having a plurality of walls and a ceiling;

a burner assembly having a burner head subassembly partly disposed inside the chamber at the ceiling;

the burner head subassembly having a burner head pipe with a gas inlet line and a gas outlet opening and having a pilot nozzle pipe for maintaining a pilot flame; and means to proportionally increase the fuel flows in the inlet lines;

flame verification means for confirming the presence of a pilot flame; and a combustion air blower; and a combustion air blower line having an inlet end portion connection to the combustion air blower and having an outlet end portion connected to the burner fuel gas inlet line;

whereby a rapidly lengthening flame is projected for creating a flame rollover effect across the chamber ceiling.

* * * * *